United States Patent [19]
Lochner et al.

[11] Patent Number: 5,995,960
[45] Date of Patent: Nov. 30, 1999

[54] METHOD AND SYSTEM FOR IMPROVING EFFICIENCY OF PROGRAMS UTILIZING DATABASES BY EXEUTING SCENARIOS BASED ON RECALLED PROCESSED INFORMATION

[75] Inventors: Terry Allen Lochner, Raleigh, N.C.; Matthew Stephen Spencer, West Pennant Hills, Australia

[73] Assignee: International Business Machines Corporaiton, Armonk, N.Y.

[21] Appl. No.: 09/057,408

[22] Filed: Apr. 8, 1998

[51] Int. Cl.⁶ ..................................................... G06F 17/30
[52] U.S. Cl. .................................. 707/3; 707/2; 707/101
[58] Field of Search ................................ 707/2, 3, 4, 101

[56] References Cited

U.S. PATENT DOCUMENTS

| | | | |
|---|---|---|---|
| 4,498,145 | 2/1985 | Baker | 364/900 |
| 4,751,702 | 6/1988 | Beier et al. | 371/9 |
| 4,796,179 | 1/1989 | Lehman et al. | 364/300 |
| 5,235,700 | 8/1993 | Alaiwan et al. | 395/575 |
| 5,355,457 | 10/1994 | Shebanow et al. | 395/375 |
| 5,504,890 | 4/1996 | Sanford | 395/600 |
| 5,530,801 | 6/1996 | Kobayashi | 395/182.11 |
| 5,551,043 | 8/1996 | Crump et al. | 395/750 |
| 5,594,881 | 1/1997 | Fecteau et al. | 395/419 |
| 5,649,136 | 7/1997 | Shen et al. | 395/591 |
| 5,655,096 | 8/1997 | Branigin | 395/376 |
| 5,659,721 | 8/1997 | Shen et al. | 395/569 |
| 5,734,885 | 3/1998 | Agrawal et al. | 707/3 |
| 5,826,076 | 10/1998 | Bradley et al. | 707/4 |

*Primary Examiner*—Jean R. Homere
*Attorney, Agent, or Firm*—Gerald R. Woods; Felsman, Bradley, Vaden, Gunter & Dillon

[57] ABSTRACT

A method and system for increasing the efficiency of database utilizing programs. The method and system accomplish their objects via the use of data-processing equipment programmed to do at least the following: extract information related to an execution of a database utilizing program from a computer memory; process the extracted information related to the execution of the database utilizing program; and write the processed information into a field of a record associated with the database utilizing program scenario. Additional objects are achieved by further programming the data-processing system to do the following: accept user input; recall the processed information in the field of the record associated with the database utilizing program scenario; modify the recalled information; and execute a scenario of the database utilizing program based upon the recalled processed information.

18 Claims, 6 Drawing Sheets

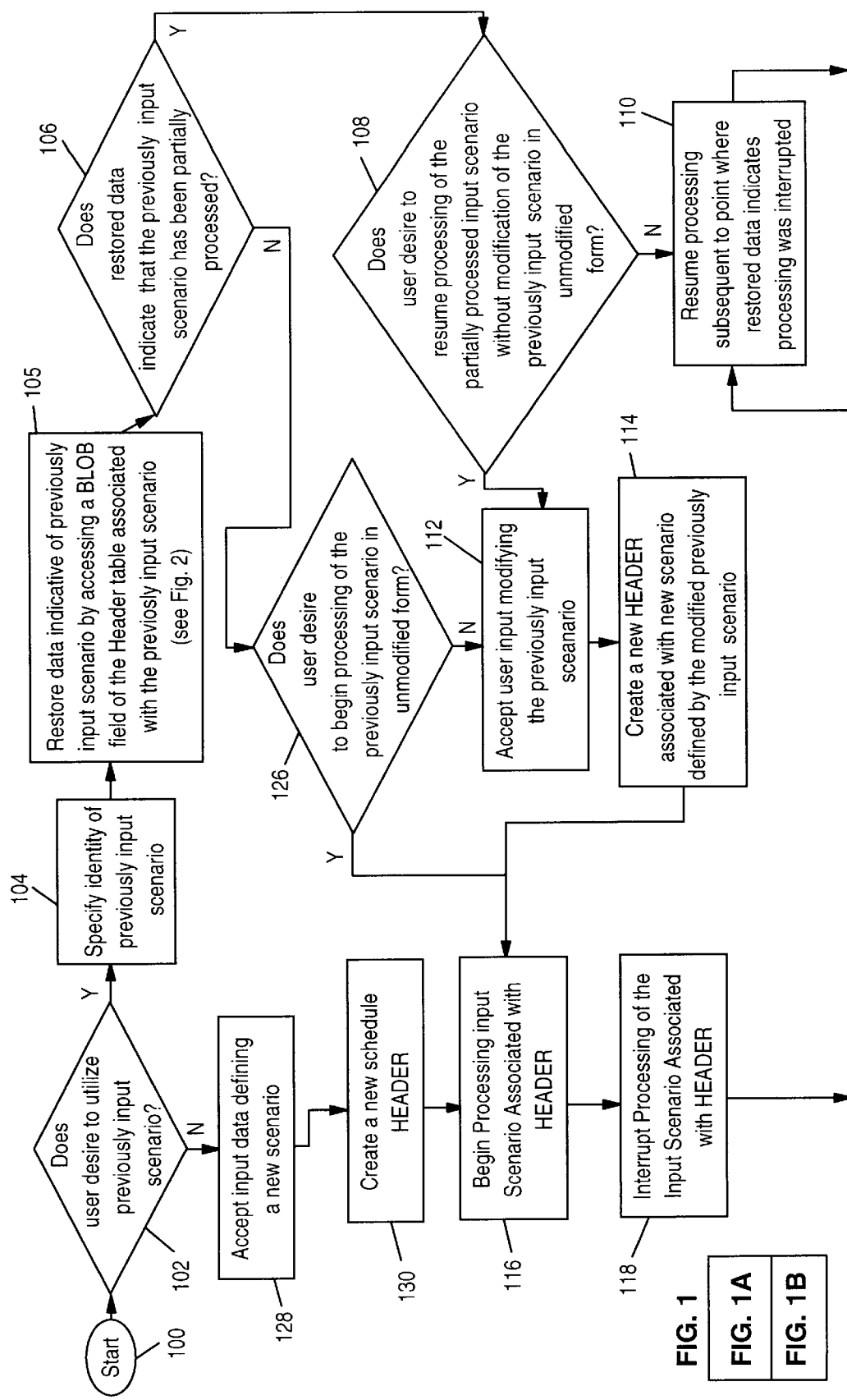

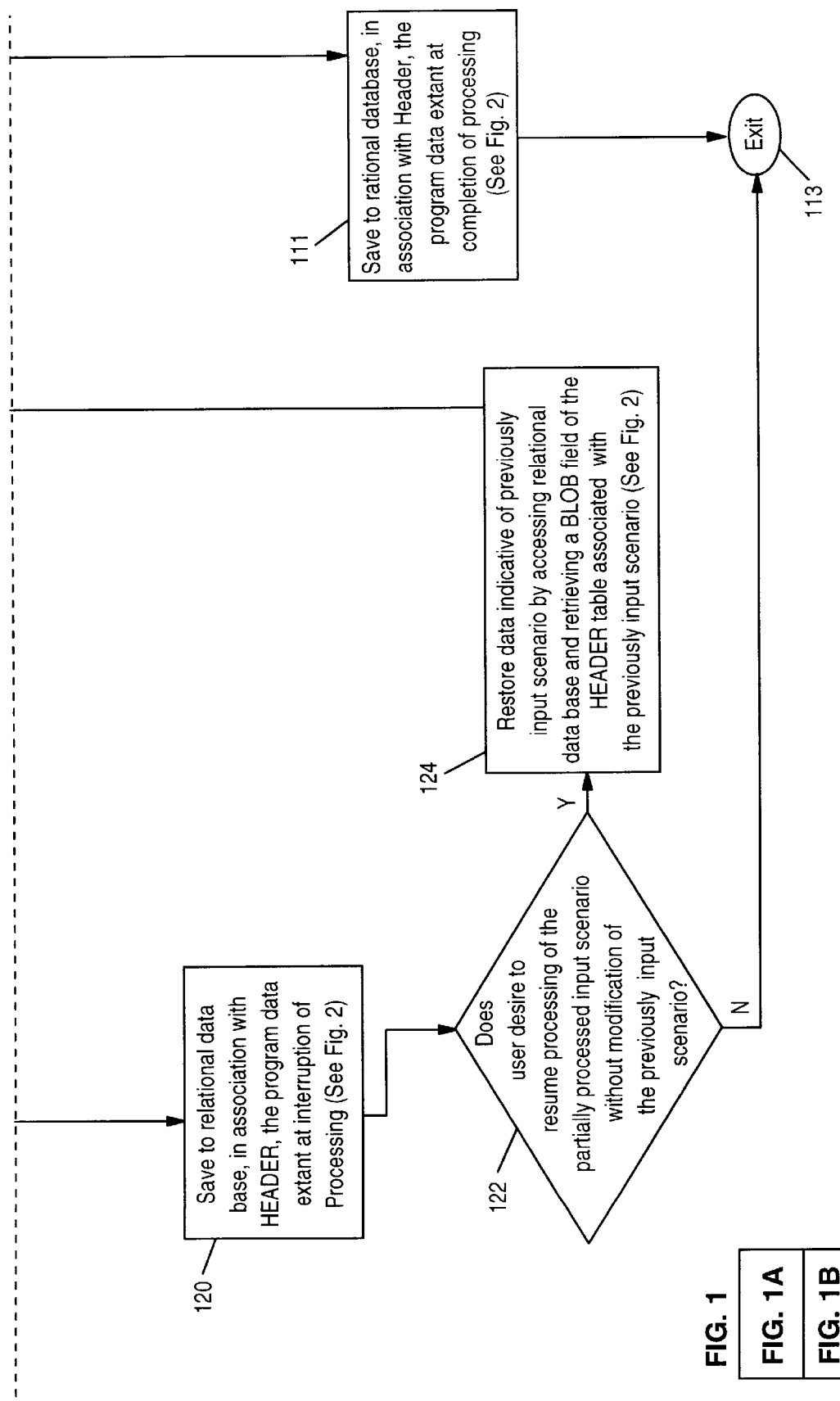

METHOD AND SYSTEM FOR IMPROVING EFFICIENCY OF PROGRAMS UTILIZING DATABASES BY EXEUTING SCENARIOS BASED ON RECALLED PROCESSED INFORMATION

BACKGROUND OF THE INVENTION

1. Field of the Invention

The present invention relates, in general, to a method and system for use with data-processing systems having database utilizing programs. Specifically, the present invention relates to a method and system, for use with data-processing systems having database utilizing programs, which improve the efficiency of such programs.

2. Description of Related Art

A data-processing system is composed of one or more computers, peripheral equipment, and software that perform data-processing. A computer is a programmable functional unit that is controlled by internally stored programs and that uses common storage for all or a part of a program and also for all or part of the data necessary for the execution of the programs; executes user-written or user-designated programs; performs user-designated data manipulation, including arithmetic operations and logic operations; and that can execute programs that modify themselves during their execution. A digital computer operates on discrete data represented as strings of binary digits. Furthermore, a computer may be a stand-alone unit or may consist of several connected units. A program consists of a sequence of instructions suitable for processing by a computer, wherein such processing may include the use of an assembler, a compiler, an interpreter, or a translator to prepare the program for execution, as well as to execute it.

A database is a file composed of records, each containing fields together with the set of operations for searching, sorting, recombining, and other functions. A record is a data structure that is a collection of fields (elements), each with its own name and type. Unlike an array, whose elements all represent the same type of information and are accessed using an index, the elements of a record represent different types of information and are accessed by name. A record can be accessed as a collective unit of elements, or the data elements can be accessed individually. The field is a location in a record in which a particular type of data is stored. For example, ALL-EMPLOYEES-RECORD might contain fields to store the LAST-NAME, FIRST-NAME, TITLE, DEPARTMENT, TASK-COMPETENCIES, WORK-SCHEDULES, VACATION-DAYS-SCHEDULED, and so on. Individual fields are characterized by their maximum length and the type of data (for example, alphabetical, numeric, or financial) that can be placed in such fields. The facility for creating these specifications usually is contained in the data definition language (DDL). In relational database management systems, fields are called columns.

A relational database is a database or database management system that stores information and tables—rows and columns of data—and conducts searches by using data and specified columns of one table defined by additional data in another table. In a relational database, the rows of the table represent records (collections of information about separate items) and the columns represent fields (particular attributes of every record). In conducting searches, a relational database matches information from the field in one table with information in a corresponding field of another table to produce a third table that combines requested data from both tables. For example, if one table contains the fields EMPLOYEE-ID, LAST-NAME, FIRST-NAME, and TASK-COMPETENCIES (e.g., competencies with respect to certain operating systems, competencies with respect certain programming languages, or competencies with respect to certain network software packages, etc.), and another contains the fields DEPT, EMPLOYEE-ID, and WORK-SCHEDULE, a relational database can match the EMPLOYEE-ID fields in the two tables to find such information as the names of all employees available to perform a certain programming task with respect to a certain operating system on a certain date. In other words, a relational database uses matching values in two tables to relate information in one to information in the other.

A database utilizing program is a program which utilizes a database to perform a certain task or tasks by interacting with, and utilizing the capabilities of, one or more databases. Such programs generally accept data, translate that data into the format acceptable to the one or more databases in use, and thereafter interact with the one or more databases in use such that the desired task or tasks are accomplished. One example of database utilizing programs is a workforce planning program which performs task planning and scheduling via the use of a database to store and manipulate data relating to the competencies and work schedules of various professionals available to a task manager.

Often database utilizing programs are used to create different scenarios utilizing different input data sets and/or different task parameters. Returning to the example of the workforce planning program, such a program could be utilized to produce different workflow scenarios based upon different defined parameters, such as various proposed employee vacation schedules.

Continuing with the example of the workforce planning program, the input data sets and/or defined parameters for such a workforce planning program can be quite large (e.g., the tasks, employees, skill sets, and work schedules associated with constructing a jet airliner). The changes to the input data set for various scenarios typically amount to only a small percentage of the data in the entire input data set. Consequently, it is often desired to be able to reuse such input data sets and defined parameters as bases for different scenarios; that is, users of the workforce planning program often wish to be able to specify merely the differences between a new scenario, and a previous scenario, and thereafter utilize the workforce planning program without being required to re-input the entire previously-entered input data set.

Currently, such user desires are satisfied by saving the input data sets and/or sets of defined parameters to one or more data files. Thereafter, such saved input data sets and/or sets of defined parameters can be recalled and modified on an as needed basis.

While the current practice of saving input data sets and/or sets of defined parameters to one or more data files satisfies user desires, it (the current practice) does so in a very inefficient manner. Such inefficiency manifests itself on several levels. For example, saving such input data sets and/or sets of defined parameters to one or more data files is often inefficient and labor-intensive from a programming standpoint in that it requires a programmer to learn and use the protocols associated with one or more (possibly operating system specific) file systems in addition to learning to use the protocols and/or languages required to write the database utilizing program as well as the protocols and/or languages associated with the database utilized by the database utilizing program. Thus, the current practice of saving input data sets and/or sets of defined parameters to one or more data files effectively adds another layer of complexity to the programming aspect of a database utilizing program. Furthermore, it will be understood by those within the art that such additional layer of complexity further manifests itself in any debugging and/or systems analysis that may be necessary should a system failure occur, in that the system analyst will need to be proficient in the language and protocols utilized in the database utilizing program proper, the protocols and language utilized by the database itself, and the protocols and languages utilized by the file system. Another example of inefficiency relates to the increased time, over and above that ordinarily necessary to run the database utilizing program, necessary to access and interact with the one or more file systems. Yet another example of inefficiency relates to the fact that the current practice of saving input data sets and/or sets of defined parameters to one or more data files typically involves saving a complete input data set and/or set of defined parameters for each different scenario.

It is therefore apparent that a need exists for a method and system, to be employed with data processing systems having at least one database utilizing program, which will provide for the reuse of input data sets and/or defined parameters as bases for different database utilizing program scenarios, but which will provide such reuse without generating programming, systems analysis, or data processing resource usage inefficiencies.

SUMMARY OF THE INVENTION

It is therefore one object of the present invention to provide a method and system for use with data-processing systems having database utilizing programs.

It is therefore another object of the present invention to provide a method and system, for use with data-processing systems having database utilizing programs, which improve the efficiency of such programs.

It is yet another object of the present invention to provide a method and system, for use with data processing systems having database utilizing programs, which improve the efficiency of such programs when input data sets and/or defined parameters are reused in order to provide bases for different database utilizing program scenarios.

The method and system accomplish their objects via the use of data-processing equipment programmed to do at least the following: extract information related to an execution of a database utilizing program from a computer memory; process the extracted information related to the execution of the database utilizing program; and write the processed information into a field of a record associated with the database utilizing program scenario. Additional objects are achieved by further programming the data-processing system to do the following: accept user input; recall the processed information in the field of the record associated with the database utilizing program scenario; modify the recalled information; and execute a scenario of the database utilizing program based upon the recalled processed information.

The above, as well as additional objects, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

FIG. 1 illustrates an environment wherein an embodiment of the present invention may be utilized;

DETAILED DESCRIPTION OF THE INVENTION

Figure 2:
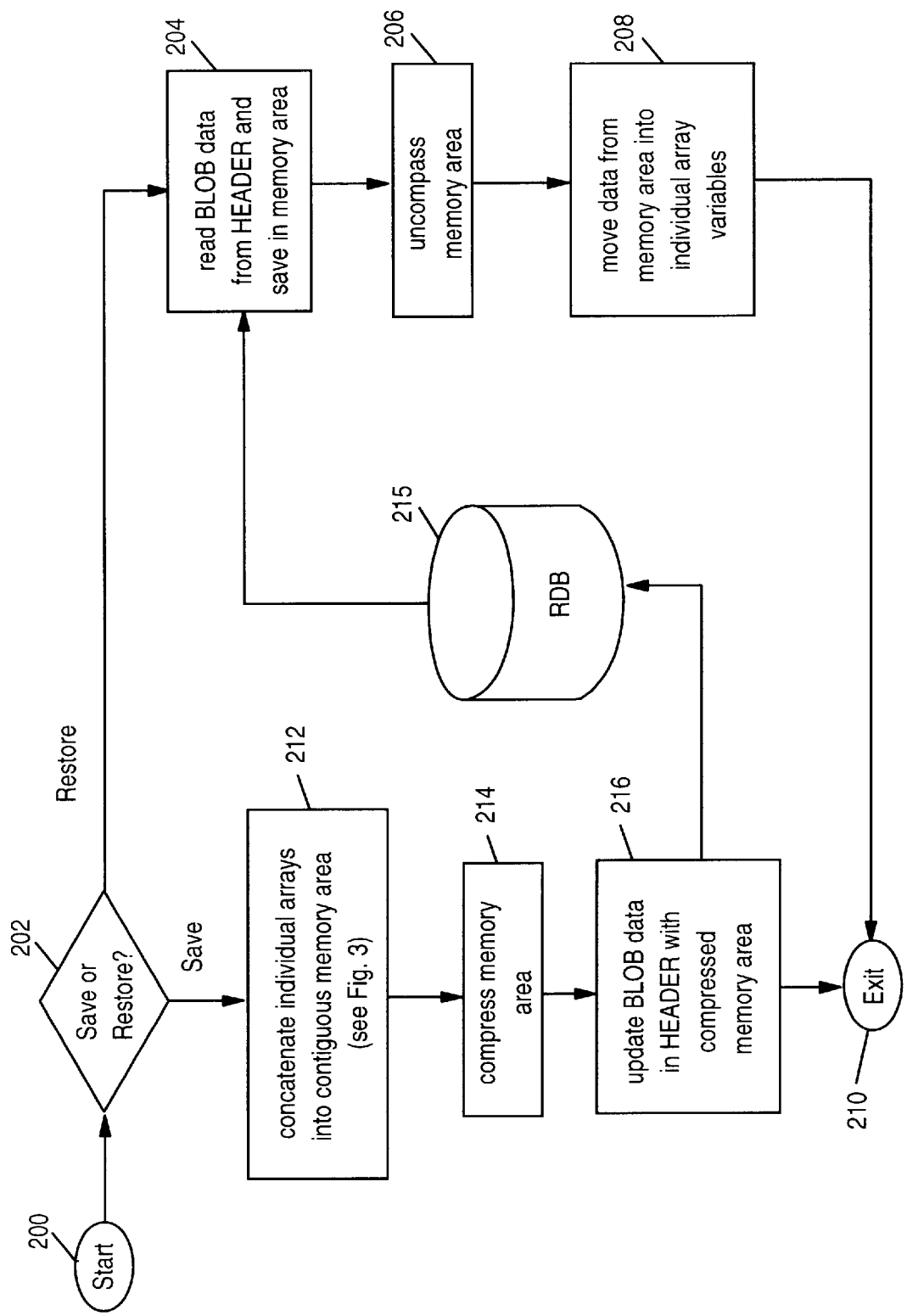
FIG. 2 depicts the process for saving and restoring checkpoint data according to one embodiment of the present invention.

The following detailed description will set forth one embodiment of the invention in the context of a database utilizing program which utilizes a relational database to generate a labor schedule related to a project. However, those skilled in the art will recognize that the method and system of the present invention can be utilized with any database utilizing program, irrespective of the task performed by such database utilizing program or the relational nature of the database.

Refer now to FIG. 1. FIG. 1 illustrates an environment wherein an embodiment of the present invention may be utilized. Method step 100 depicts the start of the process. Method step 102 illustrates the inquiry as to whether user input indicates that the user desires to utilize a previously input database utilizing program scenario (e.g., a previously defined project for which a labor schedule was to be produced by the database utilizing program). In the event that the user does desire to utilize a previously input scenario, method step 104 shows that the user specifies the identity of the previously input scenario (e.g., the user specifies the name of a particular previously input scenario). Thereafter, method step 105 depicts the restoration of the data set indicative of the previously input scenario via access of a Binary Large Object (BLOB) field of a HEADER record associated with the specifically identified previously input scenario (how this is done is discussed in more detail in FIG. 2, below). Thereafter, method step 106 illustrates the determination of whether the restored data is indicative of partial processing of the previously input scenario.

If the inquiry of method step 106 does indicate that the restored data is indicative of partial processing, the process proceeds to method step 108, which depicts the inquiry as to whether the user desires to resume processing of the partially processed input scenario without effecting modification of data associated with the previously input scenario. If the inquiry of method step 108 indicates that it is desired to resume processing without modifying data associated with the previously input scenario, the process proceeds to 110 which illustrates that processing is resumed subsequent to the point wherein the restored data indicates that processing was interrupted. Method step 111 shows that upon completion the output from the program, as well as the input scenario which generated the output, is saved to the relational database in association with the HEADER record associated with the input scenario. Thereafter the process proceeds to method step 113 and exits.

If the inquiry of method step 108 indicates that the user desires to modify data associated with the previously input scenario the process proceeds to method step 112 wherein it is shown that user input is accepted and utilized to modify the data associated with the previously input scenario. Subsequently, method step 114 depicts the creation of a new HEADER record associated with the new scenario defined by the modified data resultant from the operation shown in method step 112. Thereafter, the process proceeds to method step 116 which illustrates that processing begins on the input scenario associated with the HEADER.

Method step 118 depicts the event of the interruption of processing of the input scenario associated with the HEADER record (such interruption can occur for any one of a number of reasons, including but not limited to user input halting such processing, or reaching a point in processing where preliminary data is available). Subsequent to this interruption, method step 120 illustrates that the database utilizing program data (it should be noted that such data could include output data if the processing was interrupted subsequent to a program operation that generated output) is saved to a relational database in a BLOB field of the HEADER record associated with the input scenario. Method step 122 shows that subsequent to the saving of the data to the relational database, the inquiry is made as to whether the user desires to resume processing of the partially processed input scenario associated with the HEADER record. In the event that the user does not desire to resume processing method step 113 depicts the exiting from the process. However, if the user does desire to resume processing, method step 124 illustrates that a BLOB field of the HEADER record, associated with the input scenario for which processing was interrupted as was illustrated in method step 118, is utilized to restore the data indicative of the input scenario for which processing was interrupted. Thereafter, the process proceeds to method step 110 and subsequently executes as has been described previously.

If the inquiry of method step 106 does not indicate that the restored data is indicative of partial processing, the process proceeds to method step 126 which shows the inquiry as to whether the user desires to begin processing of the previously input scenario without modification. If the inquiry of method step 126 does indicate that the user desires to begin processing the previously input scenario without modification, the process proceeds to method step 116 and executes from that point as has been described previously. However, if the inquiry of method step 126 indicates that the user does, in fact wish to modify the previously input scenario then the process proceeds to method step 112 and executes from that point as has been described previously.

If the inquiry of method step 102 indicates that the user does not desire to utilize a previously input scenario, the process proceeds to method step 128 which shows that input data is accepted which defines a new scenario. Thereafter, method step 130 depicts the creation of a new HEADER record to be associated with the newly defined scenario. Thereafter, the process proceeds to method step 116 and executes thereafter as has been described previously.

FIG. 1 has illustrated generally how an embodiment of the present invention can be utilized. In one embodiment of the present invention, the database utilizing program is a labor scheduling program which accepts as input employee availability and skill sets, as well as data related to one or more tasks to be performed. The labor scheduling program then schedules the employees necessary to perform the labor, and it does so in two major steps: (1) by running an ordinary scheduling routine which produces an allocation of employees necessary to do the tasks that need to be performed, and (2) thereafter utilizing the output of the ordinary scheduling routine to run an optimization routine which produces the optimum, or best, schedule including the times the employees are to work and when they are to take breaks. Because employees may not be able to work certain days in a schedule, it is advantageous to interrupt processing subsequent to the termination of the ordinary scheduling routine and inquire as to whether the user desires to change the allocations resulting from the ordinary scheduling routine. In the absence of the present invention, should the user desire to make changes such as when an employee is not available to work, it is customary for the program to allow such changes after both the ordinary scheduling routine and the optimization routine have been run. Consequently, the computationally intensive optimization routine is run needlessly, and in fact may produce a non-optimum schedule. This problem is avoided, in one embodiment, by treating the completion of the ordinary scheduling routine as the processing interruption illustrated in method step 118, and thus thereafter saving both the input scenario utilized to drive the ordinary scheduling routine and the output produced by the ordinary scheduling routine in the fashion illustrated by method step 120, and thereafter utilizing such stored data to resume processing in a fashion analogous to that illustrated in method step 110.

Refer now to FIG. 2. FIG. 2 depicts the process for saving and restoring checkpoint data according to one embodiment of the present invention. Saving checkpoint data involves aggregating all pertinent data (variables and arrays) into a single allocation of memory which is compressed and finally stored in the BLOB field in the database. Restoring the checkpoint data is the reverse of the foregoing.

Method step 200 shows the start of the process. Method step 202 depicts the inquiry as to which of the "save" or "restore" flags (such flags serving to indicate whether a save or restoration of data is desired) is set. In the event that the "restore" flag is set the process proceeds to method step 204, which illustrates that the data contained within the BLOB field of the HEADER record associated with a specific input scenario is read and saved into a memory area; for sake of illustration, FIG. 2 depicts such information being read from Relational Data Base (RDB) 215. Thereafter, method step 206 shows that the data from the BLOB field of the HEADER record is decompressed; the decompression can be accomplished by use of standard decompression procedures well known to those within the art. Subsequent to the decompression, method step 208 depicts that the decompressed data is loaded into the individual array variables to be utilized by the database utilizing program, which will allow the database utilizing program to run. The process then proceeds to method step 210 and exits.

In the event that the "save" flag is set the process proceeds to method step 212, which illustrates that the data contained within the individual array variables utilized by the database utilizing program is systematically read and concatenated into a contiguous memory area (this process will be described in more detail in FIG. 3, below). Thereafter, method step 214 shows that the read and concatenated data is compressed; the compression can be accomplished by use of standard data compression procedures well-known to those within the art (it will be apparent to those within the art that the decompression procedure illustrated in method step 206 and the compression procedure illustrated in method step 214 are to be mirrored inverses of each other). Subsequent to compression, method step 216 depicts that the BLOB field of the HEADER record is either written, or updated, utilizing the compressed data resulting from the procedure utilized in method step 214; for sake of illustration, FIG. 2 depicts such information being saved to Relational Data Base (RDB) 215. The process then proceeds to method step 210 and exits.

Figure 3:
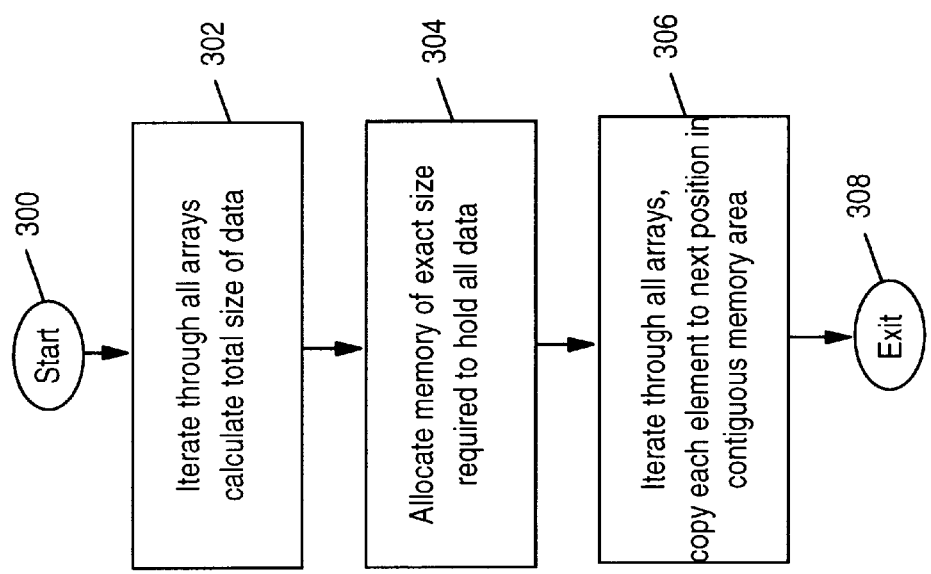
FIG. 3 illustrates the systematic reading and concatenation into a contiguous memory area of individual array variables utilized by the database utilizing program.

Refer now to FIG. 3. FIG. 3 illustrates the systematic reading and concatenation into a contiguous memory area of individual array variables utilized by the database utilizing program. Method step 300 shows the start of the process. Method step 302 depicts that the process iterates through all arrays utilized by the database utilizing program and calculates the total size of the data contained within such arrays. Method step 304 illustrates that in response to the calculated total size of the data contained within the arrays, memory is allocated sufficient to receive the data contained within the arrays. Thereafter, method step 306 shows that the process again iterates through all arrays, copying each data element of the array in contiguous fashion to the allocated memory area. The process then proceeds to method step 308 and exits.

Figure 4:
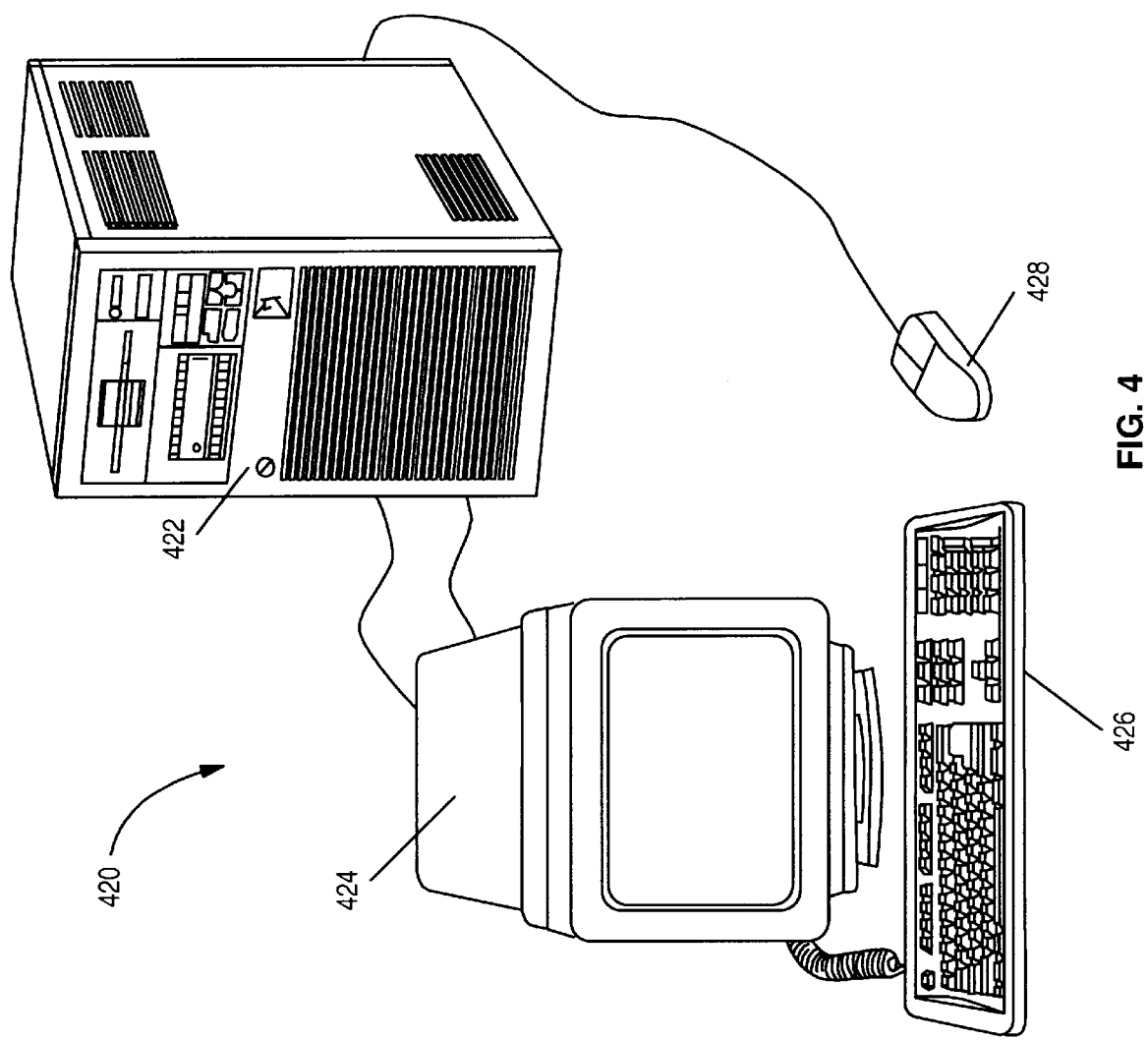
FIG. 4 depicts a pictorial representation of a data-processing system which can be utilized in accordance with the method and system of an illustrative embodiment of the present invention.

With reference now to the figures and in particular with reference now to FIG. 4, there is depicted a pictorial representation of a data-processing system which can be utilized in accordance with the method and system of an illustrative embodiment of the present invention. The method and system provided by an illustrative embodiment of the present invention can be implemented with the data-processing system depicted in FIG. 4. A computer 420 is depicted which includes a system unit 422, a video display terminal 424, a keyboard 426, and a mouse 428. Computer 420 may be implemented utilizing any suitably powerful computer, such as commercially available mainframe computers, minicomputers, or microcomputers.

Figure 5:
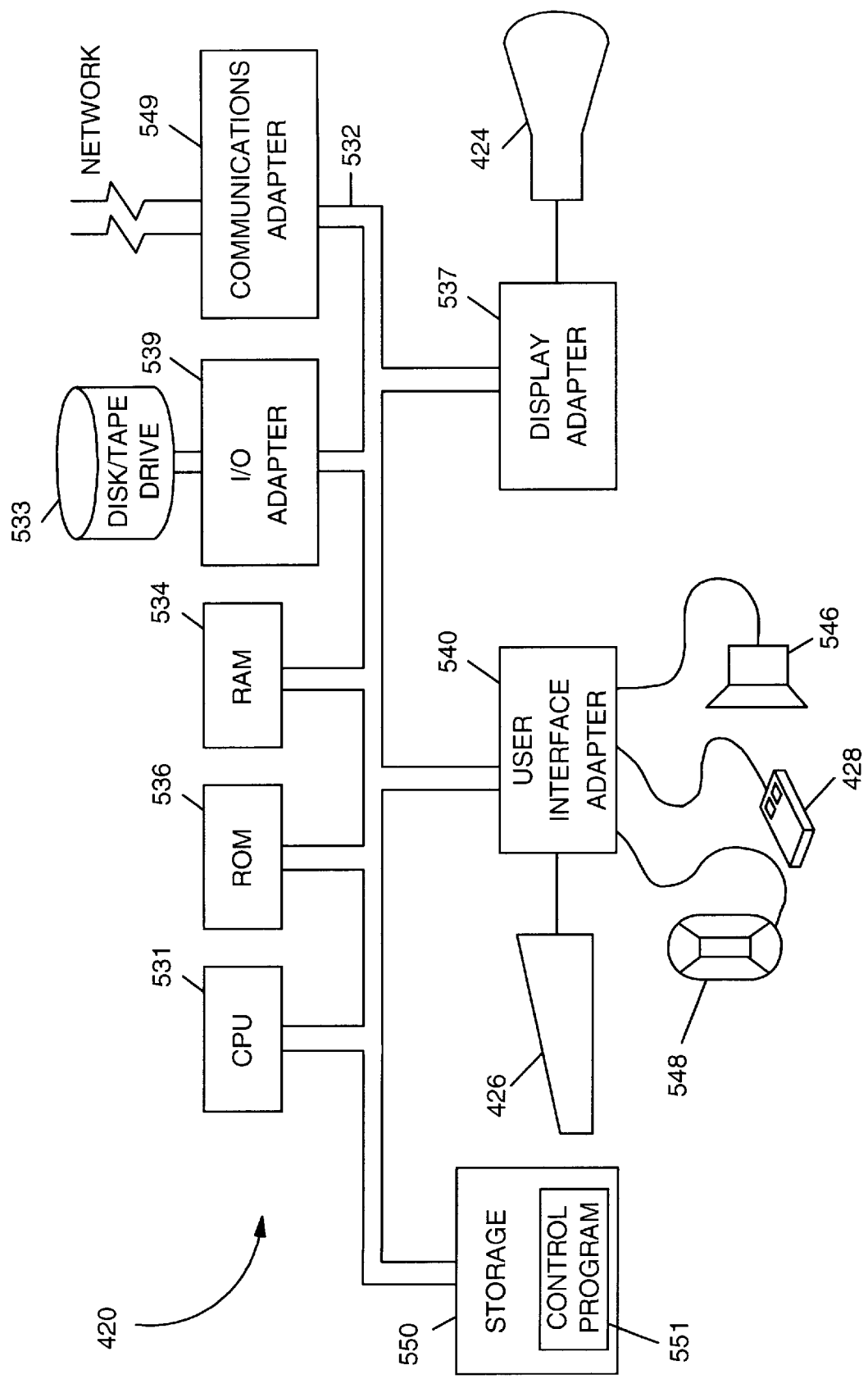
FIG. 5 is an illustration of a representative hardware environment which can be utilized in accordance with the method and system of an illustrative embodiment of the present invention.

FIG. 5 is an illustration of a representative hardware environment which can be utilized in accordance with the method and system of an illustrative embodiment of the present invention. FIG. 5 depicts selected components in computer 420 in which an illustrative embodiment of the present invention may be implemented. System unit 422 includes a Central Processing Unit ("CPU") 531, such as a conventional microprocessor, and a number of other units interconnected via system bus 532. Computer 420 includes random-access memory ("RAM") 534, read-only memory ("ROM") 536, display adapter 537 for connecting system bus 532 to video display terminal 424, and I/O adapter 539 for connecting peripheral devices (e.g., disk and tape drives 533) to system bus 532. Video display terminal 424 is the visual output of computer 420, which can be a CRT-based video display well-known in the art of computer hardware. However, with a portable or notebook-based computer, video display terminal 424 can be replaced with an LCD-based or a gas plasma-based flat-panel display. Computer 420 further includes user interface adapter 540 for connecting keyboard 426, mouse 428, speaker 546, microphone 548, and/or other user interface devices, such as a touch screen device (not shown), to system bus 532. Communications adapter 549 connects computer 420 to a data-processing network.

Any suitable machine-readable media may retain the method and system of an illustrative embodiment of the present invention, such as RAM 534, ROM 536, a magnetic diskette, magnetic tape, or optical disk (the last three being located in disk and tape drives 533). Any suitable operating system and associated graphical user interface (e.g., Microsoft Windows) may direct CPU 531. For example, the AIX operating system and AIXwindows windowing system (i.e., graphical user interface) can direct CPU 531. The AIX operating system is IBM's implementation of the UNIX operating system. UNIX is a trademark of UNIX Systems Laboratories, Inc. The RISC System/6000 system, among others, can run the AIX operating system. Other technologies can also be utilized in conjunction with CPU 531, such as touch-screen technology or human voice control. In addition, computer 420 includes a control program 551 which resides within computer storage 550. Control program 551 contains instructions that when executed on CPU 531 carries out one or more of the operations depicted in the logic flowcharts of FIGS. 1, 2, and 3, or any other illustrative example as described herein.

Those skilled in the art will appreciate that the hardware depicted in FIG. 5 may vary for specific applications. For example, other peripheral devices such as optical disk media, audio adapters, or chip programming devices, such as PAL or EPROM programming devices well-known in the art of computer hardware, and the like may be utilized in addition to or in place of the hardware already depicted.

While the invention has been shown and described with reference to particular embodiments thereof, it will be understood by those skilled in the art that the foregoing and other changes in form and detail may be made therein without departing from the spirit and scope of the invention, which is defined only by the following claims.

We claim:

1. A method for increasing the efficiency of a database utilizing program, said method comprising the steps of:
   extracting information related to an execution of a database utilizing program from a computer memory;
   in response to said step of extracting, processing the information related to the execution of the database utilizing program;
   writing the processed information into a field of a record associated with a database utilizing program scenario;
   accepting user input;
   in response to the user input, recalling the processed information in the field of the record associated with the database utilizing program scenario; and
   further in response to the user input, executing a scenario of the database utilizing program based upon the recalled processed information.

2. The method of claim 1, wherein said step of extracting information related to the execution of a database utilizing program further includes the step of extracting from the computer memory an input data set utilized by the database utilizing program.

3. The method of claim 1, wherein said step of extracting information related to the execution of a database utilizing program further includes the step of extracting from the computer memory a set of defined parameters utilized by the database utilizing program.

4. The method of claim 1, wherein said step of processing the information related to the execution further includes the step of compressing the information related to the execution.

5. The method of claim 1, wherein said step of writing the processed information into a field of a record associated with the database utilizing program scenario further includes the step of writing the process information into a field of the record representative of the database utilizing program scenario.

6. The method of claim 1, wherein said step of writing the processed information into the field of the record representative of the database utilizing program scenario further includes the step of writing the processed information to a binary large object field of the record representative of the database utilizing program scenario.

7. The method of claim 1, wherein the processed information is compressed, and said step of recalling the processed information in the field of the record associated with the database utilizing program scenario further includes the step of decompressing the processed information.

8. The method of claim 1, further comprising the step of modifying the recalled processed information.

9. The method of claim 8, wherein said step of executing a scenario of the database utilizing program based upon the recalled processed information further includes the step of executing a scenario of the database utilizing program based upon the modified recalled processed information.

10. A system for increasing the efficiency of a database utilizing program, said system comprising:

means for extracting information related to an execution of a database utilizing program from a computer memory;

means, responsive to said step of extracting, for processing the information related to the execution of the database utilizing program;

means for writing the processed information into a field of a record associated with a database utilizing program scenario;

means for accepting user input;

means, responsive to the user input, for recalling the processed information in the field of the record associated with the database utilizing program scenario; and means, further responsive to the user input, for executing a scenario of the database utilizing program based upon the recalled processed information.

11. The system of claim 10, wherein said means for extracting information related to the execution of a database utilizing program further includes means for extracting from the computer memory an input data set utilized by the database utilizing program.

12. The system of claim 10, wherein said means for extracting information related to the execution of a database utilizing program further includes means for extracting from the computer memory a set of defined parameters utilized by the database utilizing program.

13. The system of claim 10, wherein said means for processing the information related to the execution further includes means for compressing the information related to the execution.

14. The system of claim 10, wherein said means for writing the processed information into a field of a record associated with the database utilizing program scenario further includes means for writing the process information into a field of the record representative of the database utilizing program scenario.

15. The system of claim 10, wherein said means for writing the processed information into the field of the record representative of the database utilizing program scenario further includes means for writing the processed information to a binary large object field of the record representative of the database utilizing program scenario.

16. The system of claim 10, wherein the processed information is compressed, and said means for recalling the processed information in the field of the record associated with the database utilizing program scenario further includes means for decompressing the processed information.

17. The system of claim 10, further comprising means for modifying the recalled processed information.

18. The system of claim 17, wherein said means for executing a scenario of the database utilizing program based upon the recalled processed information further includes means for executing a scenario of the database utilizing program based upon the modified recalled processed information.

* * * * *